United States Patent [19]

Gram

[11] Patent Number: 4,592,709

[45] Date of Patent: Jun. 3, 1986

[54] APPARATUS FOR INSERTION STICKS INTO FREEZING POCKETS

[75] Inventor: Klaus Gram, Vojens, Denmark

[73] Assignee: Brodrene Gram A/S, Vojens, Denmark

[21] Appl. No.: 673,896

[22] Filed: Nov. 21, 1984

[30] Foreign Application Priority Data

Dec. 5, 1983 [DK] Denmark .................. 2986/83

[51] Int. Cl.$^4$ ................................. B29C 41/20
[52] U.S. Cl. .................. 425/126 S; 198/372; 425/162
[58] Field of Search .......... 53/134, 581, 594; 425/126 S, 162; 198/372; 414/417

[56] References Cited

U.S. PATENT DOCUMENTS

| 1,689,879 | 10/1928 | Krout | 425/126 S |
| 2,892,423 | 6/1959 | Glass | 425/126 S |
| 3,221,673 | 12/1965 | Shelly | 425/126 S |
| 3,478,703 | 11/1969 | Peppler et al. | 425/126 S |
| 4,105,384 | 8/1978 | Morch | 425/126 S |
| 4,130,936 | 12/1978 | Cottrell | 425/126 S |
| 4,501,365 | 2/1985 | Peyton et al. | 198/372 |

Primary Examiner—Willard E. Hoag
Attorney, Agent, or Firm—Watson, Cole, Grindle & Watson

[57] ABSTRACT

An apparatus for insertion of sticks into freezing pockets arranged row by row in a freezing machine comprises a conveyor having grooves for receiving the sticks and feeding the sticks to a number of predetermined positions. As the predetermined positions separate flicking devices are arranged for removing the sticks from the grooves positioned at the predetermined positions. The apparatus moreover comprises an insertion mechanism for inserting the sticks into a row of freezing pockets. In order to reduce stop periods in case the means for insertion of the sticks are blocked, the flicking devices are individually controllable.

7 Claims, 9 Drawing Figures

APPARATUS FOR INSERTION STICKS INTO FREEZING POCKETS

BACKGROUND OF THE INVENTION

1. Field of the Invention

The present invention relates to an apparatus for the insertion of sticks into freezing pockets arranged in rows in a freezing machine, the apparatus comprising feeding means having grooves for receiving sticks feeding the sticks to predetermined positions, means for removing sticks from the grooves and means for insertion the sticks into a row of freezing pockets.

2. The Prior Art

An apparatus of the kind referred to above is disclosed in U.S. Pat. No. 3,478,703. According to this patent the feeding means consists of a magazine band which is provided with grooves in the lower surface of the band, and which is subjected to a reciprocating movement. During forward movement, the grooves in the lower surface of the magazine band are fed with sticks and the band is moved forward until the sticks occupy the predetermined positions. Then a rod-supporting insertion means is moved downwardly whereby the ends of the sticks are pressed against an abutment which pivots in such a way that insertion means can grip the ends of the sticks. By a further downward movement of the noted rod the insertion means inserts the sticks into the freezing pockets. The number of insertion means corresponds to the number of sticks in the magazine band. The empty band is then returned and is again moved forward while sticks are being fed to the grooves. Reference is also made to U.S. Pat. No. 4,105,384 from which an apparatus of the kind referred to is known, wherein the feeding means consists of a slide having a U-shaped cross section. In the upper edges of the side walls of the slide notches are provided which form grooves for receiving the sticks. The slide is reciprocatable, and during the forward movement the slide receives sticks from a magazine. The number of sticks supplied by each stroke of the slide is twice the number of freezing pockets in a row to be provided with sticks. In the forward position the end of each stick is caught by a pivot arm which lifts the stick caught from the corresponding groove and pivots the stick to a vertical position. After a row of sticks in this way has been arranged in a vertical position, alternate ones of the sticks are gripped by means for insertion of the sticks into a row of freezing pockets. When such insertion has been carried out the pivot arms are moved parallel with themselves and, accordingly, also the remaining sticks carried by the pivot arms in such a way that the remaining sticks during the next step of the machine may be gripped by the means for insertion of the sticks into the next row of freezing pockets.

In recent years, freezing machines of the kind here in question have been made which have ever increasing capacities. During the operation of machines of the kind here in question it may happen that the picking up of a frozen body, e.g. an ice lolly, fails, so that a freezing pocket, when it arrives at the stick insertion apparatus, contains a frozen body. Such body will prevent the insertion of a stick in the pocket in question, and the stick will be broken, or it will block the means for insertion of the stick in question. Due to the fact that the machines in question work with ever increasing step velocity, serious stops may rapidly develop, because sticks will continue to be supplied to the blocked insertion means. This also requires a laborous clearing-up work and the pockets which follow a blocked pocket will not be provided with sticks.

SUMMARY OF THE INVENTION

The apparatus according to the present invention is characterized in the means for removing the sticks from the grooves are individually controllable. As such, failures of the kind referred to above may rapidly be remedied, because the supplying of sticks to the means for insertion of the sticks at the position where the failure has happened rapidly may be stopped. The insertion means in question may rapidly be brought into function again, and by restarting the means for removing sticks, and which belongs to the position in question, a correct stick insertion may rapidly be re-established.

A preferred embodiment according to the invention is characterized in that the means for removing sticks from the grooves comprise a flicking device at each position and an electromagnet adapted, in its activated condition, to keep the flicking device outside the path of the movement of an activating device serving to tension and release the flicking devices, the apparatus moreover comprising a control device for individually activating the electromagnets. Such embodiment of the apparatus according to the invention offers a secure guiding of the means for removing the sticks from the grooves and the flicking devices simultaneously allow a rapid removal of the sticks from the grooves. In this connection it should be remarked that by the term "activated condition" as used above either the magnetized or the non-magnetized condition of the electromagnets should be understood because both of these conditions may be used. However, it is preferred to obtain the activated condition by magnetization because thereby the operation will be more secure.

Stick insertion apparatuses are known wherein the means for insertion of the sticks into the freezing pockets comprise pushing rods movable in a vertical direction by means of an up- and downwardly-acting movement device to which the pushing rods are releasably connected so that a pushing rod, in case a stick being inserted should jam, is released from the moving device, and by means of the moving device is moved to a higher position than the normal lifted position of the pushing rod in question. Stick insertion apparatuses of this kind is known from the own production of the applicant in the present case. However, these known apparatuses are not provided with a feeding means having grooves for receiving the sticks for moving the sticks to the predetermined positions referred to above. If such known apparatus is provided with the individually controllable means for removing sticks from such grooves, as proposed according to the present invention, such apparatus may according to the present invention be provided with a light trap, the beam of which is so directed that it will be interrupted by such abnormally high lifted pushing rod and such light trap may be connected to an alarm apparatus. By means of such embodiment it is achieved that the attention of a person supervising the apparatus rapidly will be called to the condition of the apparatus so that such person may take action, i.e., by inactivating the means for removing sticks from the feeding means at the position to which the pushing rod in question belongs. Another advantageous embodiment to be used in connection with an insertion apparatus provided with pushing rods of the kind referred to above is according to the invention characterized in that a contact is arranged for each pushing rod, the contacts being arranged in such a way that contact is activated by the corresponding pushing rod in case the pushing rod is lifted to a higher position than the position to which the pushing rod normally is lifted, each contact being connected with the electromagnet for the corresponding pushing rod for activating the electromagnet in the activated position of the corresponding contact. By means of this embodiment it is achieved that the apparatus in question all by itself will be able to stop the supply of sticks to a pushing rod where a jamming or another failure has occurred.

A further advantageous embodiment of the invention is according to the invention characterized in that the feeding means along a length thereof corresponding to the predetermined positions comprise a number of grooves which is at least twice as high as the number of means for removing sticks from the grooves. By means of such embodiment it is achieved that the feeding means may work at a comparatively slow speed as compared with the working speed of the corresponding freezing machine.

Further features of the invention will be apparent from the attached drawings taken in conjunction with the following detailed description.

DESCRIPTION OF THE PREFERRED EMBODIMENT

Figure 1:
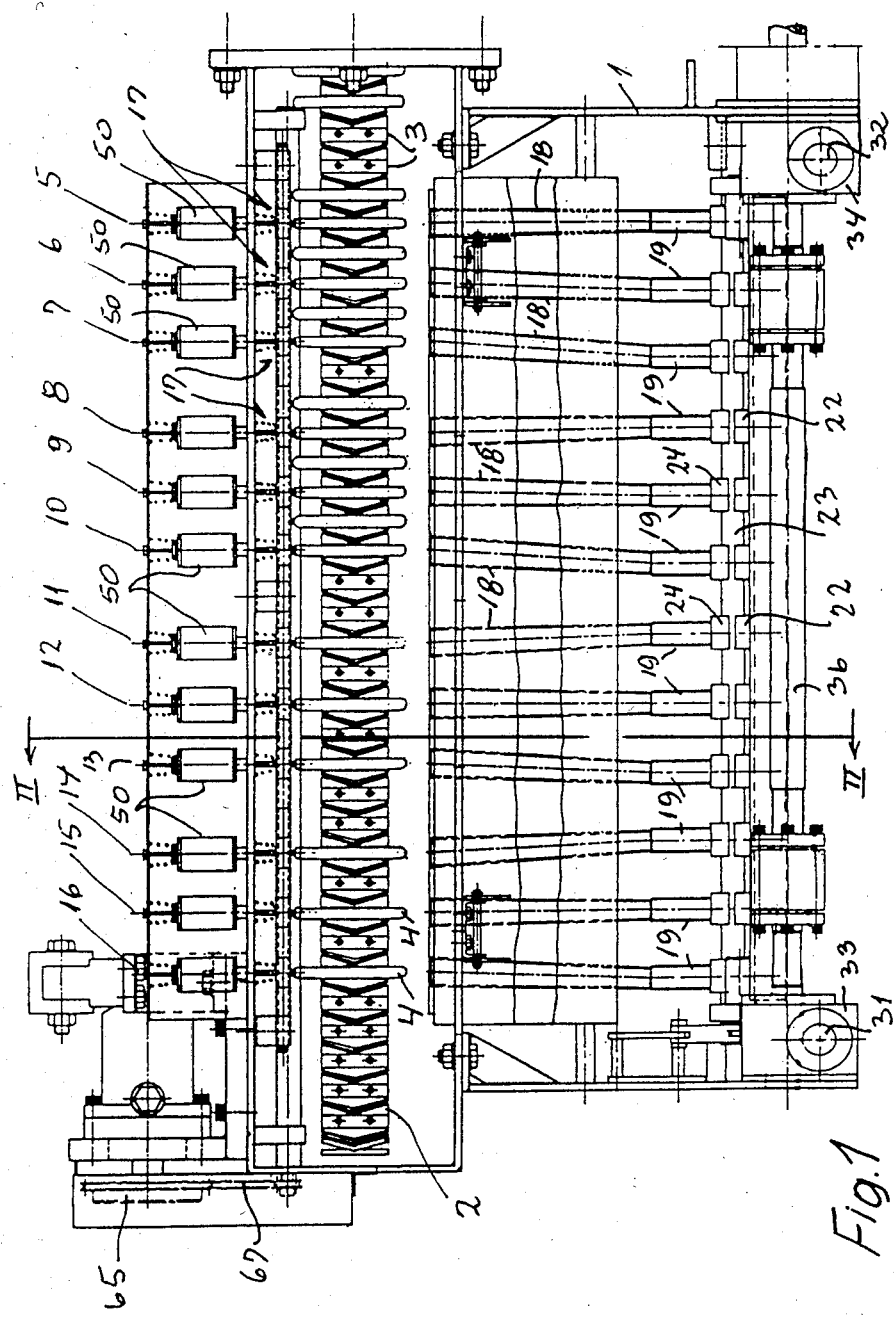
FIG. 1 is a plan view of an embodiment of the stick insertion apparatus according to the invention.

On the drawing, 1 is a frame for the apparatus illustrated, and the apparatus comprises a feeding means 2 having grooves 3 for feeding sticks 4 to predetermined positions, which in FIG. 1 are identified with the reference numerals 5, 6, 7 . . . 16 twelve total positions. The feeding means consists, according to the embodiment shown, of an endless conveyor band comprising mutually hinged links, and wherein the grooves 3 are provided with an even pitch. The conveyor band extends around an end reversing roller arranged in the frame 1 to the left in FIG. 1, but which for the sake of clarity has not been shown. In this connection it should also be noted that in the FIG. 2 only the upper run of the conveyor band 2 is shown. The conveyor band arrives from the right in FIG. 1 after having been provided with sticks by means of a stick-feeding apparatus known per se and, accordingly, not further illustrated.

Figure 2:
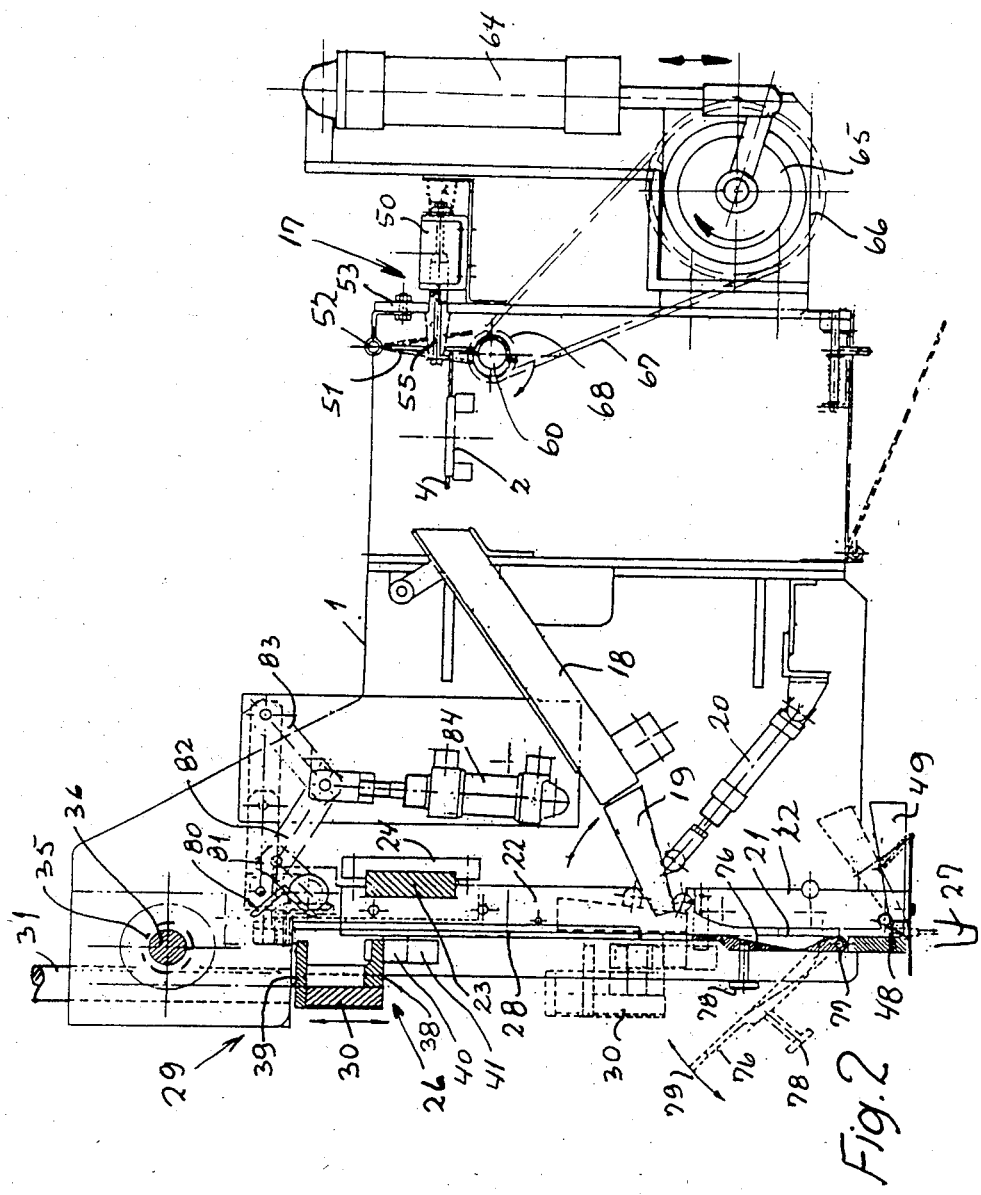
FIG. 2 is a section view as seen along section line II—II of FIG. 1, FIGS. 3A and 3B show on an enlarged scale, a front view of the apparatus shown in FIG. 1.

At each of the positions 5,6,7 . . . 16 means are arranged for removing sticks 4 from the band 2. At each position these means comprise a flicking device 17. These flicking devices 17 serve, during each step of the apparatus, to flick a stick 4 positioned opposite such flicking device into a corresponding stick guide. The stick guides are provided with the reference numeral 18. Each stick guide opens into a guiding 18 chute 19 as shown in FIG. 2, and the guiding chutes 19 are arranged parallel with each other and are spaced apart an equal distance. The guiding chutes 19 are pivotable jointly with each other from the position shown in FIG. 2 in full lines and to a generally vertical position which is shown by broken lines. In order to pivot the guiding chutes a pivoting device is provided comprising two cylinder devices 20, viz. one at each end of the apparatus. By such pivoting of a guiding chute, a stick positioned therein will be inserted into a vertical guiding groove 21 in a corresponding guiding housing 22. Each of the guiding houses is vertically secured to the frame of the apparatus, viz. to a transverse rod 23 and each housing is secured to the rod by means of a clamp 24.

Moreover, the apparatus comprises means 26 for inserting sticks into a row of freezing pockets 27, one of which is indicated in FIG. 2. The freezing pockets 27 are arranged row by row in a freezing machine (not further illustrated), and the rows may extend radially in a table of a rotating freezing machine, or the rows may extend mutually parallel for other sorts of freezing machines in connection with which the inventive apparatus may be used. From the following explanation it will be understood that the guiding housing 22 are arranged in a row and that the apparatus accordingly can insert sticks into a corresponding row of freezing pockets 27 when the latter are positioned in the position indicated in FIG. 2.

Figure 3A:
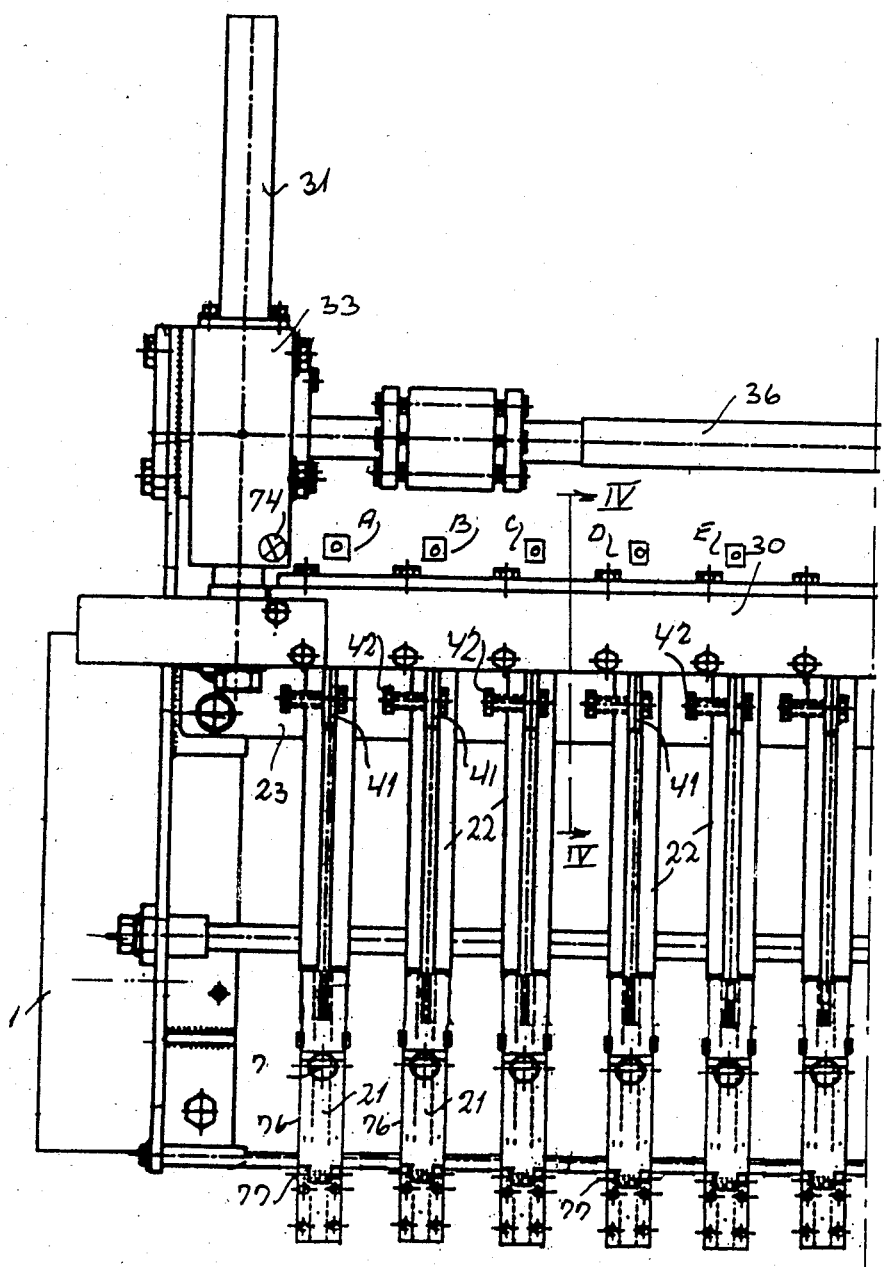
Figure 3B:
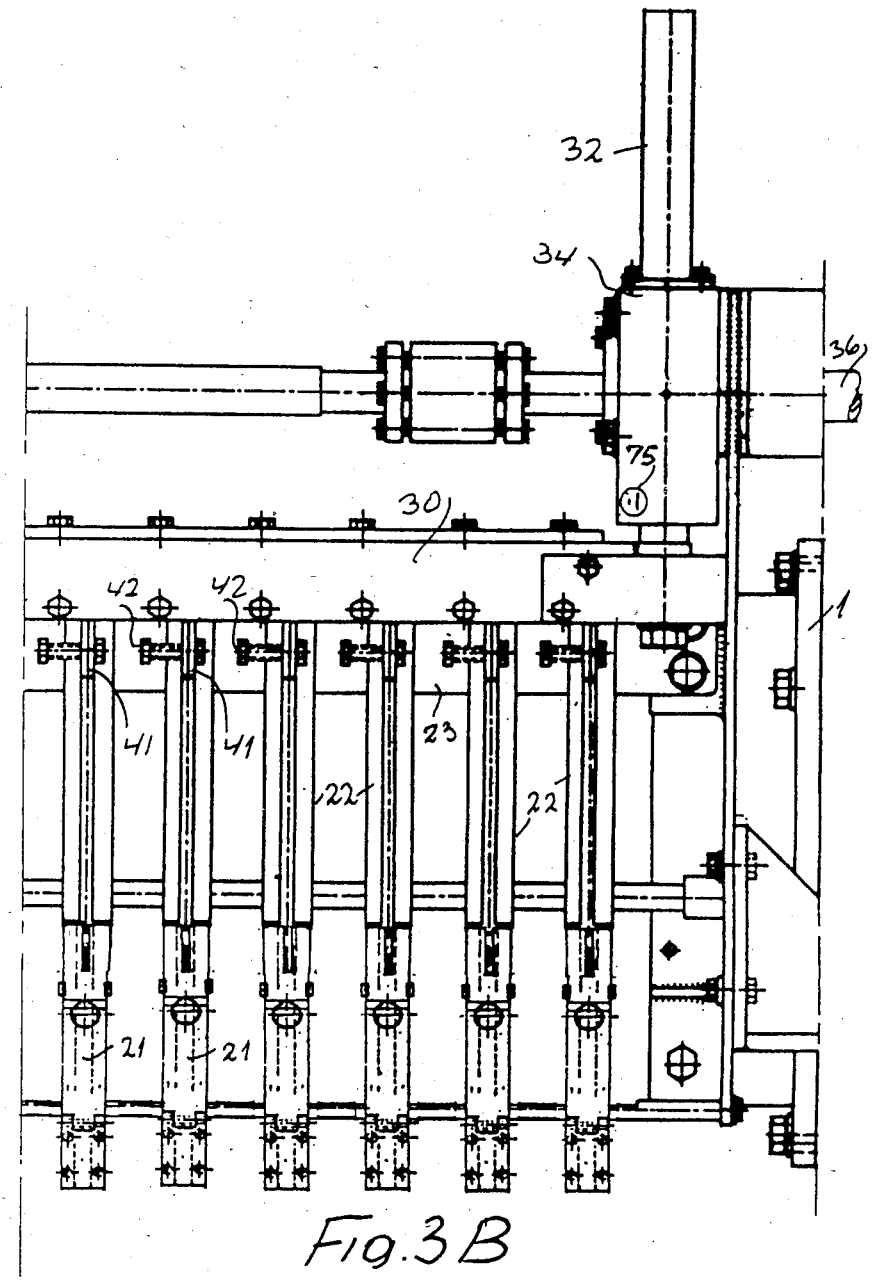
Figure 6:
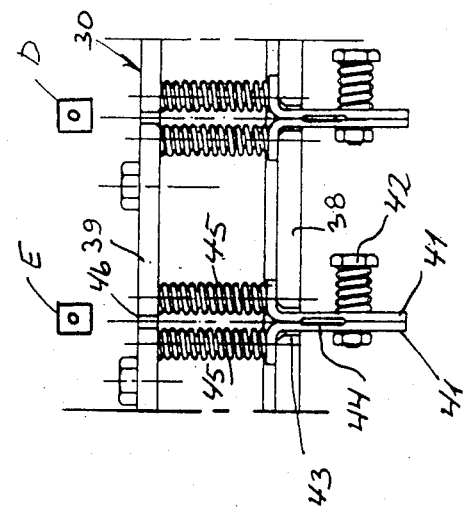
FIG. 6 is a sectional view as seen along the section line VI—VI in FIG. 4.
Figure 4:
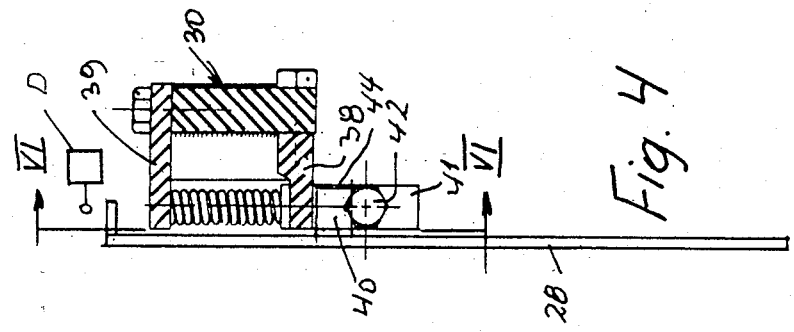
FIG. 4 is a partial sectional view as seen along section line IV—IV in FIG. 3A, illustrating a pushing rod of the apparatus in the engaged position of the rod.
Figure 5:
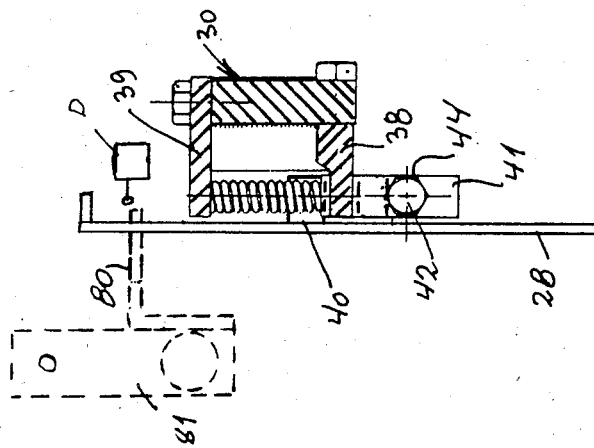
FIG. 5 is a view corresponding to FIG. 4, wherein, the pushing rod is disengaged.

In the guiding groove 21 in each housing a pushing rod 28 is movably arranged, and each such rod may be moved up and down by means of a driving device 29. The driving device comprises a beam 30 a U-shaped cross section and extending along the front side of the apparatus as it appears from FIGS. 3A and 3B. Each of the ends of the beam is connected with the lower end of a rack 31 and 32, respectively, which are movably arranged in stationary guidings 33 and 34 supported by the frame of the apparatus. A pinion 35 engages with each of the racks 31 and 32, respectively. Of the pinions 35 only one is shown in FIG. 2. The pinions are connected by means of a synchronizing shaft 36 extending outwardly from the guidings 34 as shown to the right in FIG. 3B. The outwardly extending end of the shaft 36 carries a gear wheel (not shown) which engages a rack which is movably up and down so that the shaft 36 is rotated alternatively clockwise and counter-clockwise. By transferring these movements to the racks 31 and 32, the beam 30 and accordingly also the pushing rods 28 will be moved up and down. As it appears from FIG. 4, the flanges 38 and 39 of the beam 30 point inwardly as seen from the front side of the apparatus which is shown in FIG. 3A and FIG. 3B. On the front side each of the pushing rods 28 is provided with a pushing dog 40 in the form of a vertically extending flap which as seen in FIG. 5 faces outwardly with respect to the front surface of the apparatus. In the engaged position of a pushing rod 28, the flap of the pushing rods, engages a resilient cavity 44, FIG. 6, which is recessed in two mutually facing limbs of two L-shaped clamping parts 41. The clamping parts 41 of each pair are yieldably connected by means of a bolt 42 around the shaft of which a spring is arranged. The other ends of the L-shaped clamping parts 41 are passed through an edge recess 43 in the lower flange 38 of the beam 30. Each of the ends of the clamping parts 41 is biased by a pressure spring 45 and 45, respectively, which are arranged with a sufficient mutual space for the passage of a pushing dog 40 between the springs 45,45. Opposite this space an edge recess 46 is provided in the upper flange 39 of the beam 30. As shown in FIG. 4, the pushing dog 40 of each pushing rod 28 normally engages in the corresponding cavity 44 between the clamping parts 41. However, if a pushing rod 28 meets a comparatively high resistance during the downward movement, the pushing dog 40 of such pushing rod will be disengaged from the cavity 44, and the pushing rod 28 in question will remain in its position whereas the beam 30 will continue its movement downwardly. During the following upward movement of the beam, the lower edge of the pushing dog 40 will abut the upwardly facing ends of the clamping parts 41,41 and, accordingly, the pushing rod in question will be lifted to a position at a higher level than the level achieved by the pushing rod during the normal working thereof. Such lifted position is shown in FIG. 5.

During the downward movement each pushing rod 28 normally will abut a stick arranged in the guiding groove 21 and push the stick in front of the pushing rod down and into the freezing pocket 27 arranged under the guiding groove 21 and, accordingly, such stick will be arranged in the partly frozen material positioned in such freezing pocket. However, it might happen that a stack jams under such circumstances and should that be the case, the pushing rod 28 in question will meet a high resistance as explained above, and thereby disengagement of the pushing rod as explained will be caused.

Such jamming, accordingly, will be indicated by the lifting of the pushing rod in question up above the beam 30 as shown in FIG. 5.

In order to prevent a stick which has been inserted into a guiding groove 21 from falling out of such groove by the weight of the stick itself, a small pawl is arranged at the lower end of each guiding groove 21 and such pawl withholds a stick which has been inserted into the guiding groove. Moreover, at the lower end of each groove 21 a tab 49 is pivotably arranged and the pawl 48 is secured to such tab in such a way that the tab 49 is lifted from the position shown in FIG. 2 in full lines and to the position shown by means of broken lines during the downward movement of a stick. The apparatus is provided with a light trap comprising a lamp at one side and a photo cell at the opposite side and the tabs 49 are arranged in the path of the light beam when the tabs 49 occupy the lowered position. After the downward movement of the sticks has been initiated, the light trap in question is ignited, and in case one of the tabs 49 has not been lifted due to the fact that a stick is missing in the corresponding guiding groove 21, a signal in this respect will be issued in such a way that the error in question may be corrected.

Figure 7:
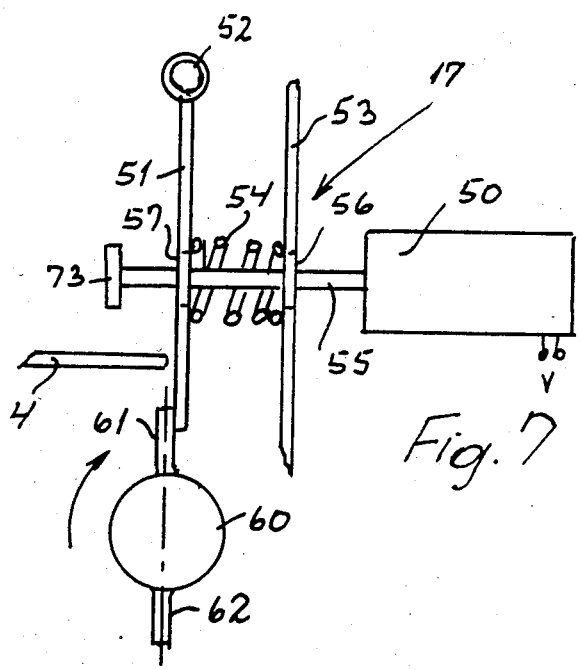
FIG. 7 shows on an enlarged scale, a flicking device for the inventive apparatus, and FIG. 8 schematically shows a part of a control apparatus for the inventive apparatus.

Each flicking device 17 comprises as indicated in FIG. 7 an electromagnet 50 and a flicking plate 51, which is pivotably suspended at its upper end by means of a bearing 52, cf. also FIG. 2. Between the flicking plate 21 and a frame part 53 a spring 54 is arranged and a rod 55, which is connected with the anchor of the electromagnet, extends through holes 56 and 57 in the frame part 53 and in the flicking plate 51, respectively.

All the flicking devices are activated by means of a shaft 60 rotatably journalled in the frame of the apparatus below the flicking devices, and which comprises two diametrically and in the longitudinal direction of the shaft 60 extending fins 61 and 62. The shaft 60 is driven from a cylinder device 64 via a ratchet device, and in such a way that each time the cylinder device 64 makes a vertical downward stroke a sprocket 66 driven by the ratchet device 65 will be rotated one step clockwise in FIG. 2. The sprocket 66 drives a chain 67 which engages the sprocket 68 arranged on one end of the shaft 60. During the upward stroke of the cylinder device 64 the ratchet device 65 leaves the sprocket 66 at rest. During each such driving movement the shaft 60 is rotated 180° clockwise as seen in FIG. 7, viz. from a position wherein the fins 61 and 62 are positioned vertically aligned with each other and to a position wherein this again is the case.

The springs 54 hold the lower end of each flicking plate 51 in abutment with that one of the fins 61,62 which at any time occupies the higher position. The flicking devices are arranged so that the flicking plates 51 in the position shown in FIG. 7 just allow the sticks 4 carried by the conveyor band 2 to pass the flicking plates.

After advancing of the conveyor band 2 to a position wherein a stick 4 is positioned opposite end of the positions 5,6,7 . . . 16, the cylinder device 64 is activated whereby the shaft 60 as mentioned will rotate half a revolution. Thereby, cf. FIG. 7, the fin 61 will pivot the flicking plates 51 to the right in FIG. 7, and simultaneously, the corresponding springs 54 will be tensioned. At the instance where the fin in question releases the lower edges of the flicking plates 51 the latter will suddenly be pivoted to the left in FIG. 7 by means of the springs 54, and accordingly the plates 51 will flick the ends of the sticks 44 positioned opposite the flicking devices in question. This flicking movement terminates before the other fin of the shaft 60 is rotated to the position which the fin 61 occupies in FIG. 7. After the rotation has occurred the fin now arriving will hold the flicking plates 51 in the position shown in FIG. 7.

The flicking movement referred to above will flick the sticks 4 concerned, one into each stick guide 18 and from there downwardly into each of the guiding chutes 19, and now these chutes 19 are ready for insertion of sticks into the guiding grooves as previously explained.

In FIG. 7 the actual flicking device is illustrated in the form of a flicking plate 51 and a spring 54, but it will be understood that the same effect may be achieved by using springs secured at their upper ends instead of the flicking plates 51.

Figure 8:
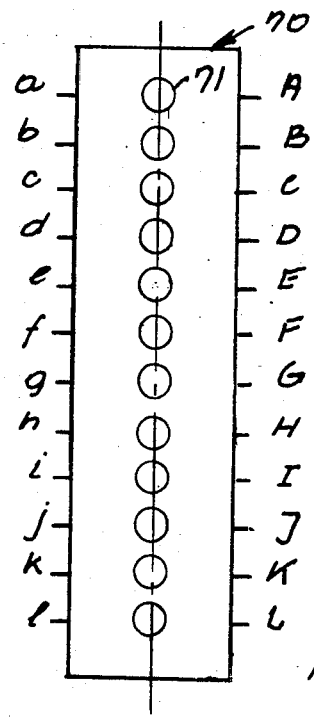

To the apparatus shown an electric control device 70 belongs having twelve terminals a,b,c . . . l, FIG. 8. The terminals are by means of conductors (not shown) connected each with one of the electromagnet 17 at the positions 5,6,7 . . . 16. The control device 70, moreover, comprising a number of buttons 71, viz. corresponding to the number of electromagnets. As soon as a person supervising the apparatus observes a functional disturbance, e.g., a lifted pushing rod as previously explained, the person in question presses the push button 71 of the corresponding electromagnet, whereby the electromagnet in question is activated and withdraws its anchor rod 55, see. FIG. 7, to the right, whereby an abutment 73 on the anchor rod in question pivots the corresponding flicking plate 51 to the right in FIG. 7, i.e., to a position wherein the lower edge of the corresponding flicking plate 51 is positioned outside the path of movement of the ends of the fins 61 and 62. Accordingly, during the next step of operation no stick will be flicked away from the conveyor band 2 at the corresponding position. Accordingly, such stick will be carried on by the conveyor band 2 past the row of flicking devices.

In order to advise the observing person about the error which has occurred, the embodiment of the apparatus illustrated comprises a light trap comprising a lamp 74, FIG. 3A, and a photo cell 75, FIG. 3B. The path of rays of this light trap extends immediately above the upper ends of the pushing rods 28 when these occupy their normally highest position. However, if a pushing rod is released as previously explained in such a way that it will occupy the position shown in FIG. 5, the pushing rod in question will break the beam of light of the light trap and an alarm signal will be released. The person in question now observes which one of the pushing rods has been released and activates the corresponding electromagnet by a pressure on the corresponding push button 71. Instead of such light trap the apparatus, as indicated by A, B, C,D, E . . . in FIG. 3A, may be provided with a number of contacts arranged immediately above each pushing rod 28 in the normally highest position of the rods. If a pushing rod is released as explained above, it will close the corresponding contact. The contacts A, B, C, . . . are by means of conductors (not shown) connected with the corresponding terminals A,B, C . . . of the control device 70, cf. FIG. 8. In the latter instance the control device 70 is arranged in such a way that if one of the contacts A, B, C . . . is closed the corresponding electromagnet will be activated via its connection with the control device 70 by means of the terminals a, b, c . . . of the device 70 as previously mentioned. In the latter instance electric lamps are used instead of the push buttons 71 and simultaneously with the functioning referred to above, the lamp corresponding to the contact A, B, C . . . in question will be switched on whereby the supervisor will be immediately advised as regards which pushing rod has been released and immediately may take the precautions necessary in order to correct the error.

Such functioning error will in the most instances consist in a jamming of a stick in a guiding groove 21. Such jamming may e.g. occur because the freezing pocket 27 positioned below the guiding groove 21 in question already contains a frozen body. This may happen if the picking up of such frozen body has failed. A frozen body will prevent the insertion of the stick in question and, accordingly, the corresponding pushing rod will not insert a stick. Accordingly, the lower end of the pushing rod will be stopped or will be driven past the upper end of the stick in question. In case the pushing rod is being stopped a release as explained above will occur and should the pushing rod be driven past the stick in question, at least a jamming will occur when the pushing rod in question tries to press the next stick downwardly. In order to be able to remove sticks from the guiding groove 21 in question in cases as just explained and in an easy way, a door 76 is arranged in opposite each guiding groove 21. Each door 76 is hinged at the lower end 77 and is provided with a handle 78 and, moreover, as shown in FIG. 2 the inner surface of the door is curved. A door is opened by pivoting the door in the direction of the arrow 79 shown in FIG. 2 and until the door in question occupies a position wherein it slopes downwardly to the left in FIG. 2. Jammed sticks may as previously mentioned easily be removed from the guiding groove 21 in question through the corresponding door, and if the supervisor manages to open the door to a jammed guiding groove 21 before the person in question activates the corresponding electromagnet, the sticks which may be supplied before the magnet in question is activated may be guided out from the guiding groove due to the curved inner surface of the doors.

After the clearing of the guiding groove in question the corresponding pushing rod may be reengaged by applying a blow against the upwardly directed end while the beam 30 occupies the upper position. Thereby the pushing dog 40 will be pressed downwardly between the clamping part 41 and will be trapped in the cavity 44 and will then again participate in the up- and downward movement of the beam.

However, as it appears from FIG. 2 and is indicated in FIG. 5, the apparatus may be provided with a stop bar 80 having angular cross section which is pivotally supported at the ends and which is connected with one end of a lever 81, the other end of which is hinged to a toggle link device 82, 83 the joint of which is connected with a cylinder device 84. In the inactive position shown in FIG. 2, one flange of the stop bar 80 is positioned outside the path of movement which the upper end of a pushing rod will follow during the last part of the upward movement in case it has been disengaged. Accordingly, the stop rod bar 80 will not interfere with the release of the alarm previously explained. However, when reengagement of a pushing rod is wanted, the cylinder device 84 is activated in such a way that the top flange of the stop bar 80 will extend into the path of movement of released pushing rods, cf. FIG. 5, and accordingly the stop bar 80 will press a disengaged pushing rod downwardly to the normally highest position. Accordingly, the pushing dog 40 of the pushing rod in question will be trapped in the corresponding cavity 44 during the next upward stroke of the beam 30.

As it appears from FIG. 1, opposite the positions 5, 6, 7 . . . 16 more than twice as many grooves 3 are positioned than twice the number of the positions. Moreover, the positions are not arranged with an even pitch because the distance between the positions corresponds to twice or three times the pitch of the grooves 3. Moreover, it will be seen that not all the grooves 3 are provided with sticks at the arrival of the conveyor band at the apparatus in question, cf. e.g. the two empty grooves 3 at the right hand end of the conveyor band portion shown in FIG. 1. The reason for this arrangement is that a particular stick supplying device is used in connection with the embodiment of the apparatus shown in the drawing for providing the band 2 with sticks from a supply of sticks. Such supplying device, when in operation, provides the band 2 with more sticks than the number of sticks to be used by the apparatus. Before the band arrives at the apparatus shown, superfluous sticks are removed and are transferred to a buffer magazine and when the latter has been filled with sticks, the stick supplying device is stopped, whereinafter the band receives sticks from the buffer magazine until the latter sends a signal to the stick supplying device which then again supplies sticks to the bands with a surplus of sticks. In this way it is secured that the band 2 always will be fed with the correct number of sticks and that the sticks were arranged according to the pattern requested. This pattern depends upon the number of positions 5,6,7 . . . 16 and the mutual distances between the positions. According to the embodiment shown on the drawing, the band 2 is moved a distance corresponding to fifteen groove pitches between each transfer operation carried out by means of the flicking devices of sticks to the means for insertion of the sticks. From FIG. 1 it will be seen that when a removal of sticks from the band is carried out during the next flicking operation, all the sticks positioned to the left of the stick positioned between the positions 9 and 10 will be removed. This, of course, will also apply as regards all the sticks positioned opposite the positions 5,6,7,8 and 9. Accordingly, on the band there will remain: a stick between the positions 10 and 9, a stick between the positions 9 and 8, a stick to the right of the position 8 followed by two empty grooves, a stick between the positions 7 and 6, a stick between the positions 6 and 5 and a stick immediately to the right of the position 5. When the band now is moved in the fifteen pitches previously referred to to the left in FIG. 1, the stick which in FIG. 1 is positioned between the two positions 10 and 9 will be positioned opposite the position 16, the following stick opposite the position 15, the following stick opposite the position 14 and the sticks will, said in few words, occupy the pattern shown in FIG. 1. In order to compensate for this uneven pitch between the positions 5, 6, 7 . . . 16, some of the stick guidings 18 are arranged a little inclined, as seen in top view, in order to be able to transfer the sticks to the guiding houses 22, which are arranged with an even pitch because it will be understood that the pitch of the guiding houses must correspond to the pitch of the freezing pockets in each row.

I claim:

1. An apparatus for inserting individual sticks into respective freezing pockets which are arranged in a row in a freezing machine, said apparatus comprising
   a feeding means for delivering a plurality of individual sticks to respective discharge positions, said freezing means including a plurality of spaced apart grooves in which said individual sticks are removably positioned,
   a separate flicking device for removing each individual stick from its associated groove in said feeding means when in its associated discharge position, each flicking device including an operating element which is movable toward and away from an associated stick on said feeding means,
   activation means which is movable in a path of travel to contact each operating element of each flicking device to cause it to discharge an associated stick from said feeding means,
   an activatable arresting means associated with each flicking device, each arresting means, when activated, moving the operating element of the associated flicking device out of the path of travel of said activation means to prevent it from discharging an associated stick from said feeding means, said activatable arresting means including an electromagnet,
   a control device connected to the electromagnet of each activatable arresting means to control its activation, and
   means for inserting each individual stick which has been discharged from a groove in said feeding means into a respective freezing pocket in said row of freezing pockets in a freezing machine.

2. An apparatus for inserting individual sticks into respective freezing pockets which are arranged in a row in a freezing machine, said apparatus comprising
   a feeding means for delivering a plurality of individual sticks to respective discharge positions, said feeding means including a plurality of spaced apart grooves in which said individual sticks are removably positioned,
   a separate removal means for removing each individual stick from its associated groove in said feeding means when in its associated discharge position,
   insertion means for inserting each individual stick which has been discharged from a groove in said feeding means into a respective freezing pocket in said row of freezing pockets in said freezing machine, said insertion means including a plurality of pushing rods, each of said pushing rods being capable of moving a respective stick into a respective freezing pocket, and a reciprocating means for moving each of said pushing rods in reciprocal vertical motion from an uppermost position to a lowermost position, each of said pushing rods being releasably connected to said reciprocating means such that upon jamming of the associated stick in its movement into a freezing pocket, the associated pushing rod will become released from reciprocating movement by said reciprocating means and will be moved to a position above its said uppermost position,
   alarm means, and
   a light trap electrically connected with to said alarm means, said light trap being positioned to detect when one of said pushing rods has moved to a position above its said uppermost position and to then cause said alarm means to operate.

3. An apparatus according to claim 1, wherein said feeding means includes at least twice as many grooves that are simultaneously positionable at said discharge positions as there are removal means.

4. An apparatus according to claim 2, wherein said feeding means comprises an endless conveyor band having said grooves therein.

5. An apparatus for inserting individual sticks into respective freezing pockets which are arranged in a row in a freezing machine, said apparatus comprising
   a feeding means for delivering a plurality of individual sticks to respective discharge positions, said feeding means including a plurality of spaced apart grooves in which said individual sticks are removably positioned,
   a separate removal means for removing each individual stick from its associated groove in said feeding means when in its associated discharge position,
   insertion means for inserting each individual stick which has been discharged from a groove in said feeding means into a respective freezing pocket in a row of freezing pockets in a freezing machine, said insertion means including a plurality of pushing rods, each of said pushing rods being capable of moving a respective stick into a respective freezing pocket, and a reciprocating means for moving each of said pushing rods in reciprocal vertical motion from an uppermost position to a lowermost position, each of said pushing rods being releasably connected to said reciprocating means such that upon jamming of the associated stick in its movement into a freezing pocket, the associated pushing rod will become released from reciprocating movement by said reciprocating means and will be moved to a position above its said uppermost position,
   a plurality of contact means located so that each is contactable by a respective pushing rod when said respective pushing rod is located in a position above its said uppermost position, each said contact means being electrically connected the respective removal means which removes sticks from said feeding means for insertion into freezing pockets by the associated pushing rod so as to terminate operation of said assocated removal means.

6. An apparatus according to claim 3, wherein said feeding means includes at least two as many grooves that are simultaneously positionable at said discharge positions as there are removal means.

7. An apparatus according to claim 6, wherein said feeding means comprises an endless conveyor band having said grooves therein.

* * * * *

UNITED STATES PATENT AND TRADEMARK OFFICE
CERTIFICATE OF CORRECTION

PATENT NO. : 4,592,709

DATED : June 3, 1986

INVENTOR(S) : Klaus Gram

It is certified that error appears in the above-identified patent and that said Letters Patent is hereby corrected as shown below:

On the title page, Item [30] should read:

[30]   Foreign Application Priority Data

December 5, 1983   Denmark ........... 5594/83

Signed and Sealed this

Twenty-sixth Day of August 1986

[SEAL]

Attest:

DONALD J. QUIGG

Attesting Officer

Commissioner of Patents and Trademarks